July 15, 1941.   S. K. WELLMAN   2,249,281
CUSHIONED CLUTCH AND FACING
Filed May 26, 1939
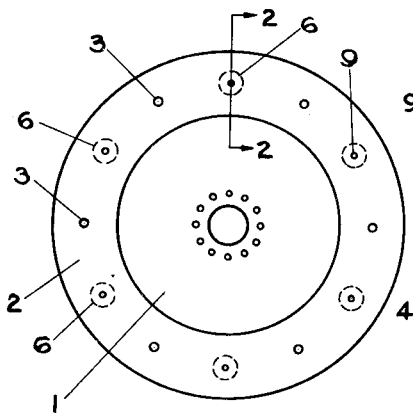
Fig.-1
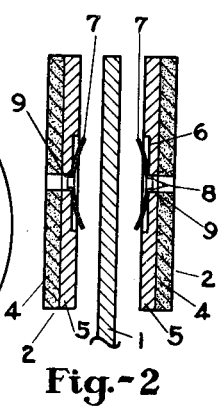
Fig.-2
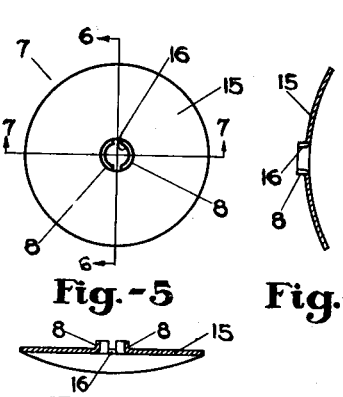
Fig.-5  Fig.-7
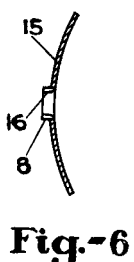
Fig.-6
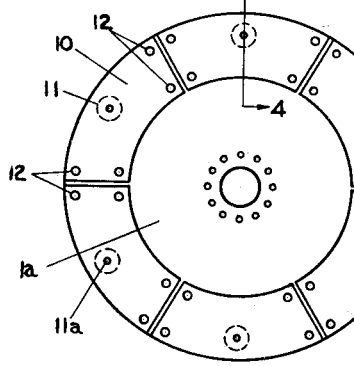
Fig.-3
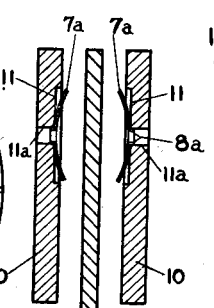
Fig.-4
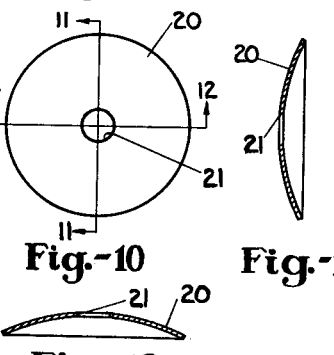
Fig.-10  Fig.-12
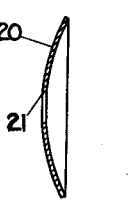
Fig.-11
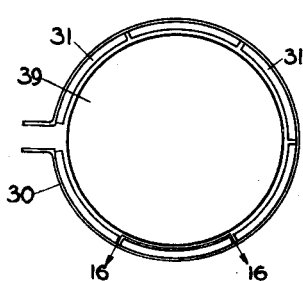
Fig.-15
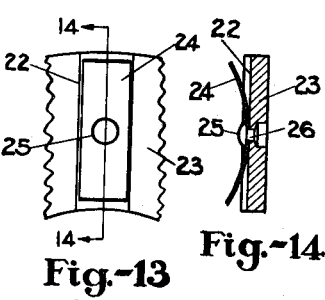
Fig.-13  Fig.-14
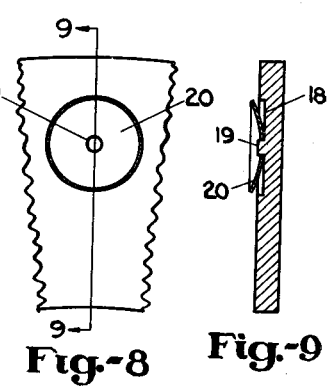
Fig.-8  Fig.-9
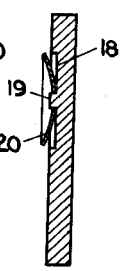
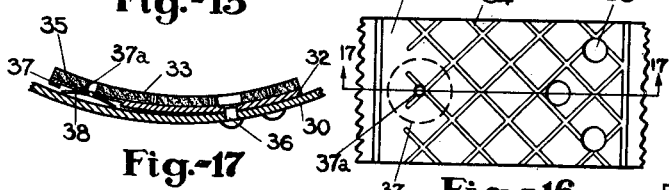
Fig.-17
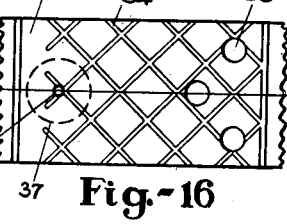
Fig.-16
INVENTOR
Samuel K. Wellman
BY
G. G. Christensen
ATTORNEY Patented July 15, 1941

2,249,281

UNITED STATES PATENT OFFICE 2,249,281

CUSHIONED CLUTCH AND FACING

Samuel K. Wellman, Cleveland Heights, Ohio, assignor to The S. K. Wellman Company, Cleveland, Ohio, a corporation of Ohio Application May 26, 1939, Serial No. 275,837

17 Claims. (Cl. 192—107)

This invention relates to frictional devices and more particularly to means for improving the operating characteristics of clutches and brakes. Specifically it relates to a frictional facing structure and to the use of cushioning means in cooperation therewith.

It is an object of this invention to provide a frictional facing, and particularly a replacement unit, which is adapted to have cushioning means incorporated in its structure.

It is a further object to provide a novel cushioning element particularly adapted for use with the facing structure of this invention.

It is another object to provide a novel cushioned facing structure which may be incorporated into all types of brakes and friction clutches without materially altering the weight of any spinning members thereof.

It is still another object to provide means for reducing or eliminating chattering and grabbing in friction clutches and for overcoming non-uniform action of brakes.

Cushioned clutches and their advantages have been known for many years, but heretofore the advantages of the cushion action have been restricted to clutches which were expressly designed to include cushioning means as an integral part of their structure. In many of these clutches, the advantages of the cushion action were more than offset by the complexity of the mechanical structure. In others, also embodying complex structures, the cushioned portions of the clutch facing constituted only a minor part of the total frictional area, with the result that the cushioning was substantially ineffective.

Now according to my invention, these disadvantages are overcome by providing a facing structure in which the cushioning means are adapted to form a part of the facing rather than to form a part of the mounting for the facing, as in prior structures. Furthermore, novel cushioning elements are provided which are effective in cushioning a major part of the whole frictional area of the facing. Moreover, the facing structure of my invention is adapted to be used on all types of friction clutches, whether of the disc, cone, or drum type, and is also adapted to be used to replace the conventional replaceable facings on such clutches. When used in the latter manner, the advantages of a cushioned structure are imparted to the clutch without materially altering the weight of the spinning members, and without the necessity of making any alterations in the mounting for the facing. Accordingly it will be understood that my invention provides a facing which may be substituted for that originally supplied on any friction clutch, with the result that the advantages of a cushioned action may be obtained even where the clutch was not designed originally to include such cushioning. These advantages are likewise imparted in similar manner to brakes and braking structures.

In order to explain my invention and its advantages more fully, reference is made to the accompanying drawing, in which Fig. 1 is a plan view of a disc clutch member having rings of composite facing material secured thereto.

Fig. 2 is an enlarged and expanded sectional view taken along line 2, 2 of Fig. 1.

Fig. 3 is a plan view of a clutch member having a plurality of segmental facing members secured thereto to simulate, in effect, a ring facing.

Fig. 4 is an enlarged and expanded sectional view taken along line 4, 4 of Fig. 3.

Fig. 5 is an enlarged plan view of a disc spring adapted for use in the facings of Figs. 1–4.

Fig. 6 is a sectional view of the spring of Fig. 5 taken along the line 6, 6 thereof.

Fig. 7 is a sectional view of the spring of Fig. 5 taken along the line 7, 7 thereof.

Fig. 8 is a plan view of a modified facing structure adapted to permit the use of an annular spring.

Fig. 9 is a vertical section taken along the line 9, 9 of Figure 8.

Fig. 10 is an enlarged plan view of the annular spring shown in Figures 8 and 9.

Fig. 11 is a sectional view of the spring of Figure 10 taken along the line of 11—11 thereof.

Fig. 12 is a sectional view of the spring of Fig. 10 taken along the line 12—12 thereof.

Fig. 13 is a plan view of another modified facing structure adapted to use a leaf spring, and in which the spring is positioned radially.

Fig. 14 is a sectional view taken along the line 14—14 of Fig. 13.

Figs. 15 through 17 represent a modified mounting arrangement in which the facing material is rigidly secured at one end and cushioned at the other, the particular embodiment which is illustrated being a brake band in which Fig. 15 is an elevation view of a brake band and drum assembly showing a brake band having a plurality of facing units secured to its surface.

Fig. 16 is an enlarged plan view of one of the facing units as taken along the line 16, 16 of Fig. 15.

Fig. 17 is a sectional view taken along the line 17, 17 of Fig. 16.

Referring now to Figures 1 and 2, a clutch assembly is illustrated which comprises a clutch member 1, having a composite facing ring 2 secured thereto at spaced intervals by any suitable fastening means such as rivets 3, 3. The facing ring consists of a friction layer 4, preferably composed of sintered powdered metal, which is securely united to a metallic backing member 5. Recesses 6, 6 are provided on the back surface of the metallic backing member.

A spring 7 is positioned in each of these recesses 6, 6. The structure of the spring will be described subsequently in detail, but projections 8, 8, extending from the back side of the spring 7, frictionally engage the periphery of hole 9 so as to position and hold the spring in place in the assembly. As will be seen from Figure 2, the edges of the spring are adapted to bear against the clutch member 1 when the facings 2, 2 have been secured thereto by the rivets 3, 3. The facings 2 are thus prevented from bearing firmly against clutch member 1 until sufficient pressure has been applied to their surfaces to overcome the strength of the cushioning springs.

When such pressure is applied, each spring will compress into its recess 6, and thereby permit the facing 2 to come into contact with member 1 and be supported by it. In the preferred structure shown in Fig. 1, each recess 6 is positioned approximately midway between the adjacent rivets 3, 3, in which position the spring is most effective in bowing or flexing the facing member outwardly.

In Figures 3 and 4 is shown a segmental facing member 10 which is adapted to be secured, together with a plurality of similar segments, to a clutch member 1a so as to form, in effect, a facing ring which is similar to that shown in Fig. 1. Each of the segments 10 is provided with a recess 11 on its back surface, in which spring 7a, similar to the spring shown in Fig. 2, is positioned by means of tangs 8a extending into hole 11a. The facing may be secured to clutch member 1a by means of rivets 12—12 or similar fastening means. The spring 7 of Fig. 2, and spring 7a of Fig. 4 are illustrated in Fig. 5 in an enlarged view. The spring consists of a disc 15 of spring sheet metal which is curved as shown in Figs. 6 and 7 about an axis extending parallel to a diameter of the disc so as to form a portion of a cylinder. The curvature of the member is, of course, immaterial to its operation and may be either single or compound. A central opening 16 is provided, and situated around the periphery of this opening, and extending outwardly from the convex side of the spring are projections 8, 8 the surfaces of which are substantially parallel to each other. These projections or tangs are adapted to fit tightly into the hole 9 which is positioned centrally in the recess 6. It will, therefore, be seen that the tangs are used to center the spring in the recess and to hold it securely in place prior to and during assembly and during use.

Figure 8 illustrates a modified structure in which an annular recess 18 is provided. The projection 19, which constitutes the central portion of the annulus, is used to position the spring in the recess, as shown in Fig. 9. The structure of a spring suitable for use with this type of recess is shown in Fig. 10, and is seen to consist of a disc of spring metal 20, having a central opening 21, which is of such diameter as to fit easily over projection 19 in the annular recess. The disc 20 may be bent in the shape shown in Figures 6 and 7 or it may be approximately spherical, as shown by Figures 11 and 12. The particular structure will depend to some extent upon the strength of spring which is desired. The outer diameter of the spring 20 and the outer diameter of the recess are dimensioned so that there will be clearance between them when the spring has been fully compressed.

Figures 13 and 14 represent another modification; one in which a leaf spring is used. The recess consists of a parallel-sided slot 22 extending radially across the back of the facing member 23. A leaf spring 24 adapted to rest in the slot, may be provided with a central opening of any suitable shape, and for example, may be held by means of a headed rivet 25 having a body portion 26 passing through it and into the facing. In such case, a clearance hole may be provided in the supporting member directly opposite thereto, so that the head of the rivet will not prevent the facing from being compressed into full engagement with the supporting member. As another example, if bent wire springs are used, the ends of the wire may be inserted into holes extending into the recess, so as to be frictionally retained by them.

It will now be understood that the essence of my invention is the provision of a facing member which is adapted to have cushioning means incorporated into its structure. The facing and its cushioning members together form a unit which is adapted to be substituted for facings of similar dimensions which are not provided with cushions. The substitution is made possible primarily by reason of the simplicity of the cushioning structure and the unitary nature of the assembly. These features make the structure especially advantageous as a replacement unit.

The effectiveness of the cushioning elements will be understood to result from their tendency to bow or flex the facing outwardly with respect to the supporting member. It consequently will be apparent that the facing member and the cushioning spring must be designed to cooperate in producing this result, by providing a facing which may be flexed by the force of the spring which is to be used with it. Those skilled in the art will recognize that the basic design elements to be considered in producing the above result are the stiffness of the facing, the length of facing between the spring and the adjacent points of fastening, and the modulus of the spring. Knowing these elements, the deflection of the facing may be determined. Conversely, knowing the deflection which is desired, the above elements may be proportioned so as to produce that deflection. The mathematics involved in such design problems are too well understood by those skilled in the art to require further explanation. As an example, however, I have found that a spring as shown in Fig. 5 having an outer diameter of .75 inch, an inner diameter of .125 inch, a thickness of .015 inch, when made of tempered chrome-vanadium steel produces a deflection of .020 inch when positioned as shown in Fig. 1 approximately midway between adjacent rivets, spaced about 5 inches apart and when the facing consists of a steel backing member 1.87 inches wide and .060 inch thick, having a sintered copper-iron-tin-lead friction layer .063 inch thick alloy-bonded to its surface.

In assembling a facing to its supporting member it will be clear that a spring, when of the type shown in Fig. 5, is positioned in each recess on the back of the facing, and the tangs thereof are firmly pressed into engagement with the wall of holes 9, 9. The facing may then be riveted or otherwise secured to the clutch member without danger of any of the springs working loose and dropping out during the joining process. Similarly, when using the springs of Figures 10 thru 14, their central openings may be dimensioned so as to frictionally engage the centering pin in which case they will be held in place during riveting. Or their central openings may be dimensioned so as to fit loosely around the centering pin. In this case, the facing may be laid on a table with the recessed side uppermost, and the springs rested in the recesses. The clutch member may then be laid upon the springs, and secured to the facing.

A clutch assembly as made according to my invention will present a warped friction surface for engagement with the other clutch members, since each unsupported section of facing is bowed outwardly by a spring. Upon engagement with the contacting clutch member, however, the facing is pressed inwardly toward its supporting member whereupon the cushioning springs are compressed into their recesses. When the full engagement pressure has been applied to the clutch, each of the springs will have been fully compressed into its recess and the back face of the facing member will bear firmly against the supporting member to which it is secured. The whole friction area of the facing will then be in contact with the opposing clutch member, with the result that it may transmit full power. The cushioning action at the moment of engagement is very effective in producing smoother engagement and in overcoming the tendency of the clutch to "grab" suddenly, or to "chatter", since it permits more gradual application of the engagement pressure. Furthermore, after the full engagement pressure has been applied, the cushions help in equalizing inequalities in engagement pressure due to any unevenness of the friction surface, with the result that the friction properties are used more effectively in transmitting power.

Having now explained the principles of my invention it will be apparent that they may be applied to many types of frictional articles using a wide variety of facing materials. For example, a cushioned facing may be applied to a cone or cylinder clutch by using a plurality of conical or cylindrical facing segments, each of which is provided with a cushion, much in the manner shown in Fig. 3. Obviously the segments must be of such dimensions that they are adapted to be flexed by the cushion springs which cooperate with them, in the same manner as pointed out above. In this connection it will be understood that the type of friction material which is used is relatively immaterial so long as it is flexible enough to be flexed by the action of the cushions, and so long as its recessed portions are stiff enough to retain the cushioning springs positioned therein. It accordingly may be either metallic or non-metallic, and either homogeneous or composite. Moreover, the invention may be used on other friction devices than clutches as for example on brake bands; and may also be used in antifrictional assemblies as for example in cushioned thrust bearings. It will therefore be understood that the invention is adaptable for use wherever a cushioning action is desired in connection with a replaceable wearing surface, whether that surface has either frictional or antifrictional characteristics. For this reason, the term "frictional device" is used herein in a generic sense, to mean devices which employ either a friction surface, or an antifriction surface. The term "friction device" is used in a more restricted sense and is intended to refer to devices which employ only a friction material; i. e., one having a relatively high coefficient of friction. For example, the term "friction device" includes such elements as brakes and clutches.

As an example of the manner in which a facing material may be used in a brake structure, a cushion mounting is shown in Figures 15 through 17. Referring first to Figure 15, it will be seen that the brake assembly consists of a brake drum 39 and a brake band 30 having a plurality of facing units 31 secured to its inner surface. The particular feature in this structure is the cantilever type cushion mounting which is provided for each of the facing units. The mounting will be better understood through reference to Figures 16 and 17, in which it will be seen that each unit is rigidly secured at one end to the brake band, while the other end is flexibly supported on a cushion element placed between the unit and the band. A composite facing element has been illustrated here, but it will, of course, be understood that homogeneous types of facing materials could be used as well. The composite units consist of a sintered powder-metal friction surface 33, alloy bonded to a metallic backing member 32. The major portion of this friction surface may be divided into smaller areas by means of the intersecting grooves 34. A portion, 35, however, situated at the cushioned end of the unit is not grooved. The purpose of this will appear subsequently. The unit is secured at one end to the brake band 30 by means of rivets 36, or by any other suitable fastening means. Near the opposite end of the unit there is provided a recess 37, having a cushion element, 38, positioned in hole 37a for the purpose of holding this end of the facing unit away from the brake band. Of course, when sufficient pressure is applied to the assembly to compress the cushion elements, the facing units will be forced into contact with the band, as will be understood from the previous discussion.

While the mounting arrangement shown in Figures 15 through 17 is suitable for use wherever a cushion action is desired, the cantilever structure is particularly desirable where a friction surface runs in liquid. For example, some types of brakes are constructed so as to be wholly or partially immersed in an oil bath, one usual purpose of which is to facilitate cooling of the brake members. Under such conditions the friction characteristics of the facing material are prevented from exerting their full influence at the first moment of contact or for an interval of time thereafter until the oil film separating the facing from the brake drum has been broken down or removed. The oil film between the members produces the effect that the brake seemingly fails to have any braking action for an interval of time after it is applied. It may then suddenly take effect so violently as to endanger the device. Now the cantilever cushion structure which is shown here has been found to be very helpful in overcoming this difficulty. The unscored portion 35 of the facing is provided for use in this connection. Assuming that a brake drum 39 is rotating in a counterclockwise direction with respect to brake band 30, it will be seen that the cushioned and unscored end of each of the friction units will first contact the rotating drum, with the result that portion 35 will be caused to bear under low pressure upon the drum and act as a scraper which will remove the excess oil and tend to reduce the thickness of the oil film remaining upon the surface of drum 39. Now as the brake pressure is increased, the cushion 38 will be compressed into its recess with the result that more frictional material will be brought into contact with the drum. This increased area will then tend to reduce the thickness of the oil film even further so that as this action continues the oil film will be removed gradually. By the time the whole frictional unit has been brought into contact with the drum the oil film will have been substantially dissipated and the friction characteristics of the facing material will be unimpeded in exerting their full braking action. In this way sudden and violent engagement is prevented, and the brake action is rendered more uniform. It will, of course, be understood that this type of action is not limited to brake members but may be applied to clutches as well, or to any device wherein this type of difficulty occurs when it is operated in a liquid.

While the invention has been described in connection with preferred embodiments wherein the advantages are most readily apparent, it should be understood that the principles may be applied to many uses not mentioned specifically herein. Furthermore, the illustrations represent mere exemplary structures, many modifications of which will occur to those skilled in the art. It accordingly is desired that the invention be restricted in scope only by the following claims.

Having now fully explained my invention, what I claim is:

1. In a frictional device of the type wherein a plate-like frictional facing member is secured to a support, a unitary cushioned frictional facing assembly which comprises a frictional facing member having desired frictional characteristics at one of its faces and characterized by having cushioning means positioned in a recess provided in the opposite face, said cushioning means being secured only to said facing member and adapted normally to impel a portion of said facing member away from a support when said facing member is secured flatwise adjacent the latter, and further adapted to be wholly received within said recess when the said portion of the facing member is forced into face to face contact with said support.

2. A frictional device comprising: a support; a frictional facing member secured flatwise adjacent said support with a portion thereof adapted to be flexed toward and away from said support; and cushioning means positioned between said support and the said portion of the facing member to normally impel the latter away from the support; said facing member being a relatively thin plate-like body having substantially coextensive opposed faces, one of said faces having desired frictional characteristics, the opposed face being provided with a recess and having said cushioning means positioned in said recess and secured therein to said facing member, said recess being adapted wholly to receive said cushioning means when the said flexible portion of the member is pressed into face to face contact with the support.

3. A frictional device comprising: a support; a frictional facing member secured flatwise to said support by spaced fastenings disposed within the length of said facing member, the portion between said spaced fastenings being adapted to be flexed toward and away from said support; and cushioning means positioned between said support and the said flexible portion of the facing member to normally impel the latter away from the support; said facing member being a relatively thin plate-like body having substantially coextensive opposed faces, one of said faces having desired frictional characteristics, the opposed face being provided with a recess and having said cushioning means positioned in said recess and secured therein to said facing member, said recess being adapted wholly to receive said cushioning means when the said flexible portion of the member is pressed into face to face contact with the support.

4. A frictional device as claimed in claim 2 wherein said cushioning means consists of a disc spring of sheet metal.

5. A frictional device as claimed in claim 3 wherein said cushioning means consists of a disc spring of sheet metal.

6. A frictional device as claimed in claim 2 wherein said recess consists of a first cylindrical opening extending inwardly from the said opposed face with its axis substantially perpendicular thereto, and a second cylindrical opening of smaller diameter forming a coaxial extension thereof.

7. A frictional device as claimed in claim 3 wherein said recess consists of a first cylindrical opening extending inwardly from said opposed face with its axis substantially perpendicular thereto, and a second cylindrical opening of smaller diameter forming a coaxial extension thereof.

8. A frictional device as claimed in claim 2 wherein said recess comprises a first cylindrical opening extending inwardly from said opposed face with its axis substantially perpendicular thereto, and a second cylindrical opening of smaller diameter contiguous thereto and coaxial therewith; and wherein said cushioning means consists of a disc of sheet spring metal curved substantially about an axis extending parallel to a diameter of said disc, and having projections positioned symmetrically with respect to the center of said disc and extending outwardly from the convex side thereof in substantially parallel directions, said disc of sheet spring metal being positioned in said first cylindrical opening with the said projections in frictional engagement with the walls of said second cylindrical opening whereby said disc spring is frictionally retained in substantially concentric relationship with the walls of said first cylindrical opening.

9. A frictional device as claimed in claim 3 wherein said recess comprises a first cylindrical opening extending inwardly from said opposed face with its axis substantially perpendicular thereto, and a second cylindrical opening of smaller diameter contiguous thereto and coaxial therewith; and wherein said cushioning means consists of a disc of sheet spring metal curved substantially about an axis extending parallel to a diameter of said disc, and having projections positioned symmetrically with respect to the center of said disc and extending outwardly from the convex side thereof in substantially parallel directions, said disc of sheet spring metal being positioned in said first cylindrical opening with the said projections in frictional engagement with the walls of said second cylindrical opening whereby said disc spring is frictionally retained in substantially concentric relationship with the walls of said first cylindrical opening.

10. As an article of manufacture, a unitary cushioned frictional facing assembly, said assembly comprising a plate-like frictional facing member adapted to be secured flatwise upon a support with a portion thereof unsecured and free to be flexed toward and away from said support, said member having desired frictional characteristics at one of its faces and having resilient cushioning means positioned in a recess provided in the opposite face in the vicinity of said flexible portion, said cushioning means being secured to said facing member and adapted normally to impel said portion of said facing member away from said support when said facing is secured to the latter, and further adapted to be wholly received within said recess when the said portion of the facing is forced into face to face contact with said support.

11. As an article of manufacture, a unitary cushioned frictional facing assembly, said assembly comprising a plate-like frictional facing member adapted to be secured flatwise at one end thereof to a support with the opposite end thereof unsecured and free to be flexed toward and away from said support, said member having desired frictional characteristics at its exposed face and having resilient cushioning means positioned and secured in a recess provided in the opposite face in the vicinity of said flexible portion, said cushioning means being secured only to said facing member and adapted normally to impel said portion of said facing member away from said support when said facing is secured to the latter, and further adapted to be wholly received within said recess when the said portion of the facing is forced into face to face contact with said support.

12. As an article of manufacture, a unitary cushioned frictional facing assembly, said assembly comprising a plate-like frictional facing member adapted to be secured flatwise to a support by means of spaced fastenings disposed within the length of said member and with the intervening portion thereof unsecured and free to be flexed toward and away from said support, said member having desired frictional characteristics at its exposed face and having resilient cushioning means secured to and positioned in a recess provided in the opposite face within the length of said intervening flexible portion, said cushioning means being adapted normally to impel said portion of said facing member away from said support when said facing is secured to the latter, and further adapted to be wholly received within said recess when the said portion of the facing is forced into face to face contact with said support.

13. A frictional facing assembly as claimed in claim 1 wherein said facing member is of bi-metallic construction, the face thereof having desired frictional characteristics being composed predominantly of sintered powdered metallic materials.

14. A facing member as claimed in claim 11 wherein said face having desirable frictional characteristics is composed of sintered powdered metallic material and is traversed with grooves extending part way through the thickness of said member, and being disposed within the area of said face extending from the secured end of said member to an intermediate position, the area of said face extending from said intermediate position to the unsecured end being free of grooves.

15. A resilient cushion element comprising a disc of sheet spring metal curved substantially about an axis extending parallel to a diameter of said disc, and having projections positioned symmetrically with respect to the center of said disc and extending outwardly from the convex surface thereof in substantially parallel directions.

16. A frictional device as claimed in claim 2 wherein said cushioning means consists of a disc of sheet spring metal curved substantially about an axis extending parallel to a diameter of said disc, and having projections positioned symmetrically with respect to the center of said disc and extending outwardly from the convex side thereof in substantially parallel directions.

17. A frictional device as claimed in claim 3 wherein said cushioning means consists of a disc of sheet spring metal curved substantially about an axis extending parallel to a diameter of said disc, and having projections positioned symmetrically with respect to the center of said disc and extending outwardly from the convex side thereof in substantially parallel directions.

SAMUEL K. WELLMAN.